UNITED STATES PATENT OFFICE.

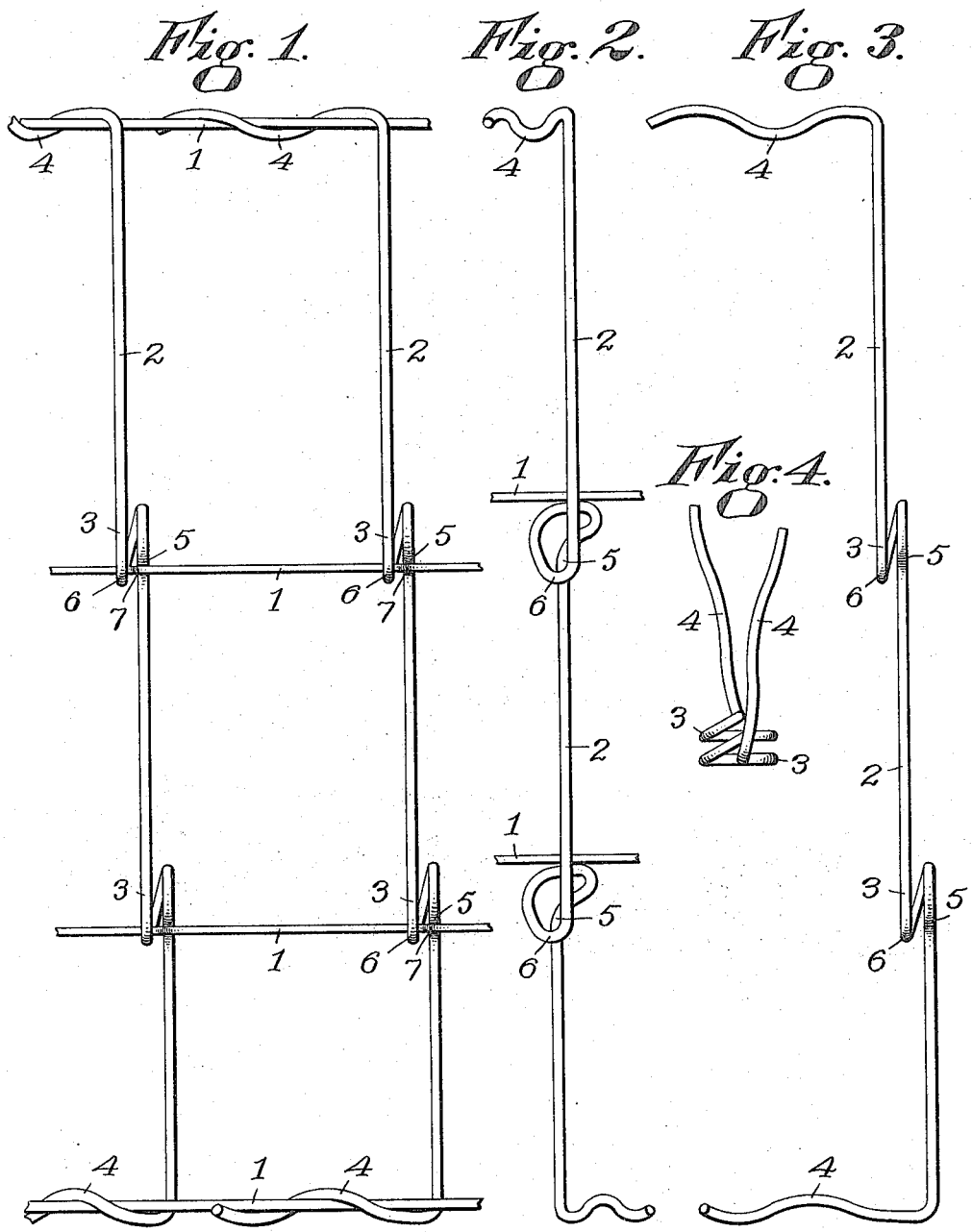

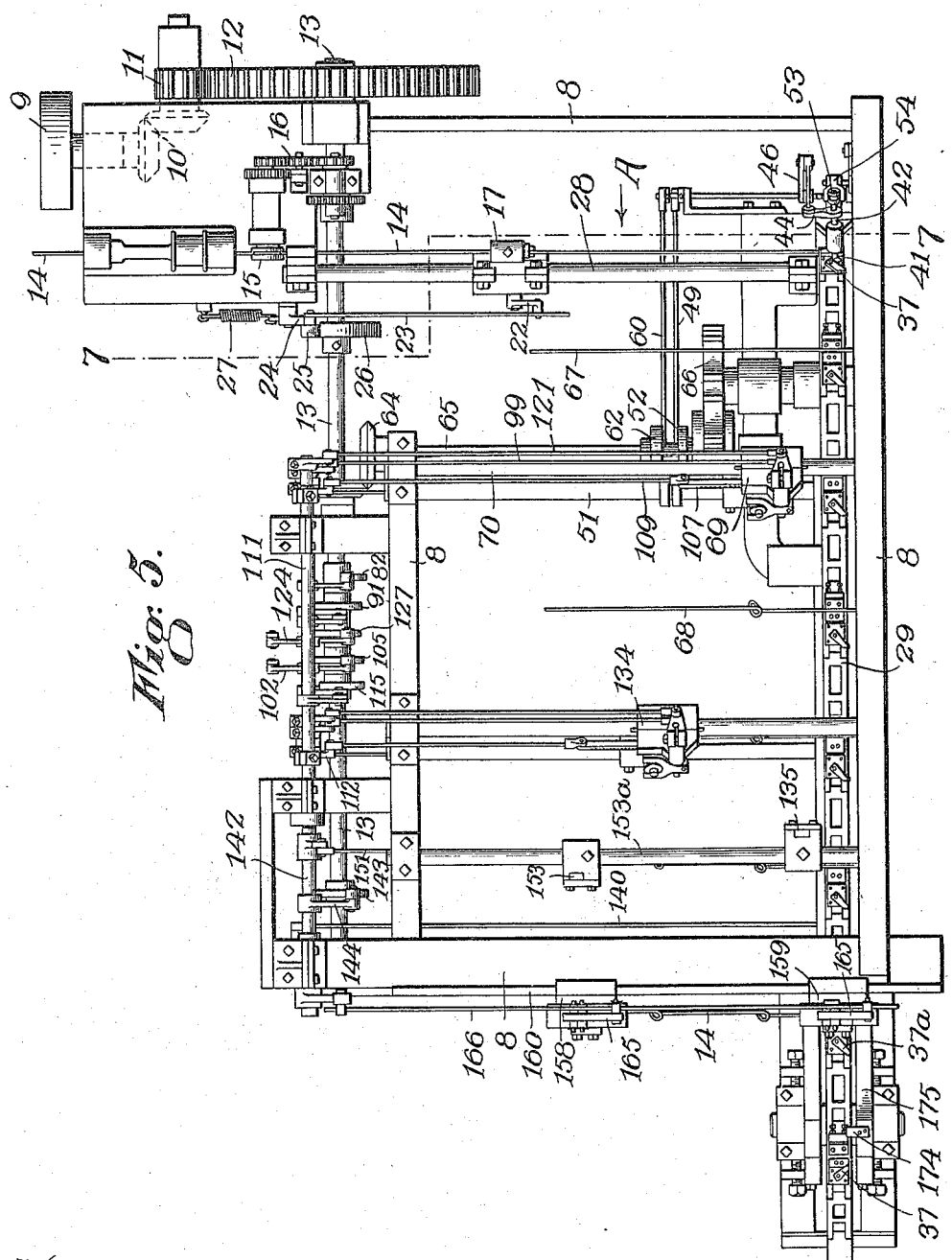

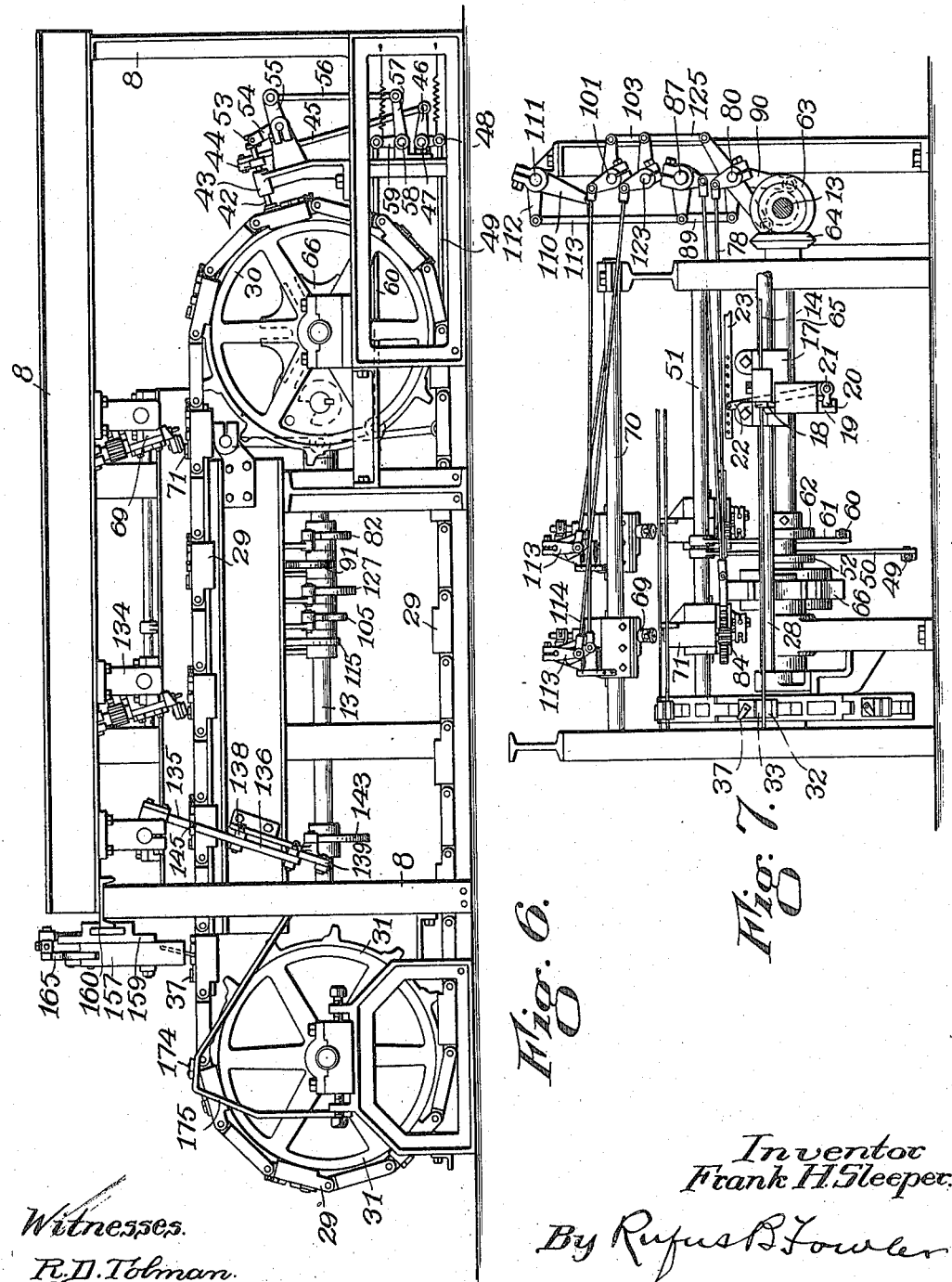

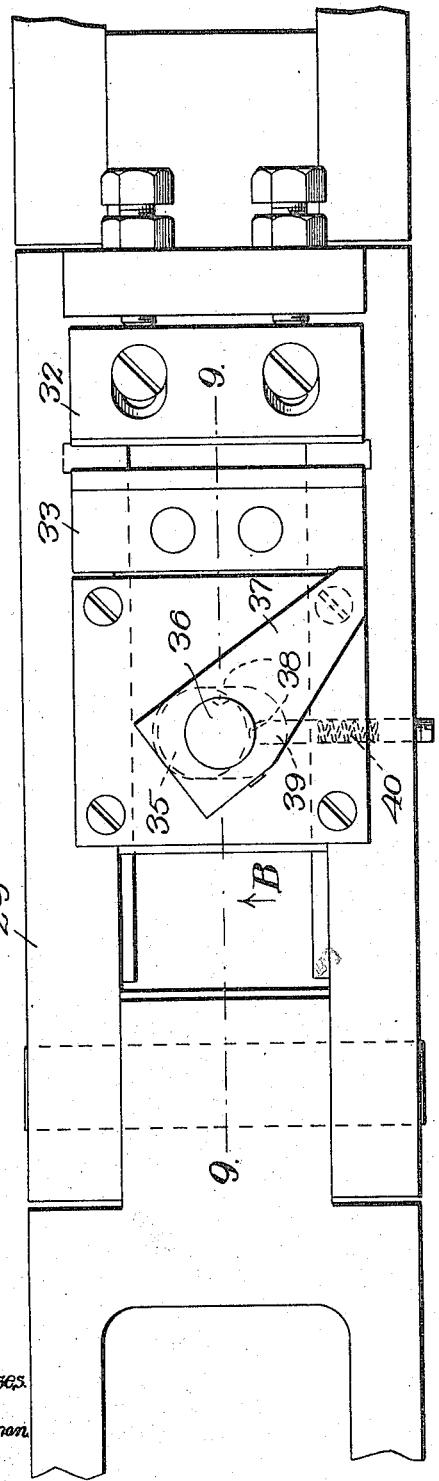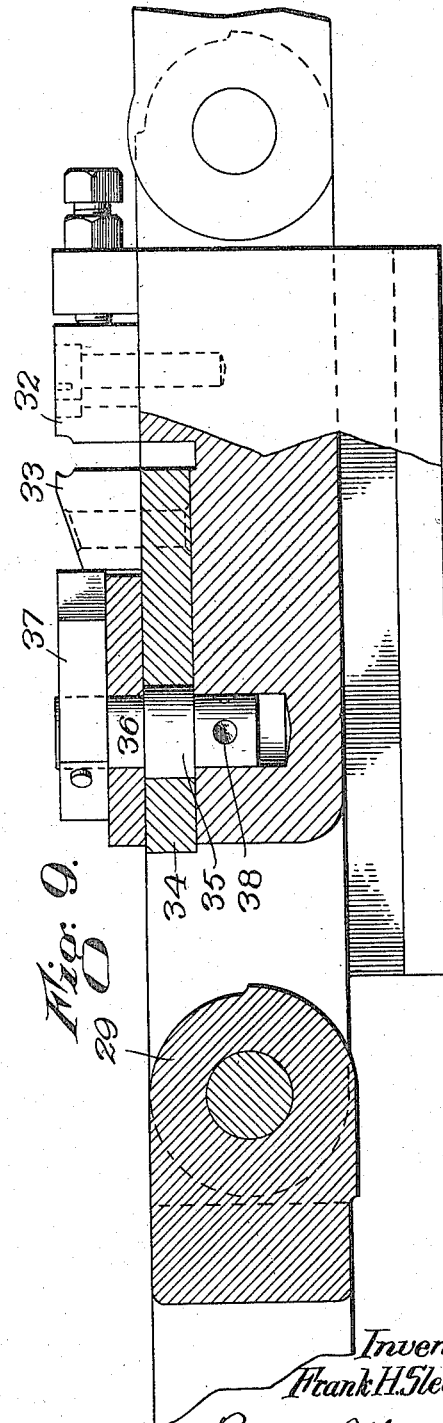

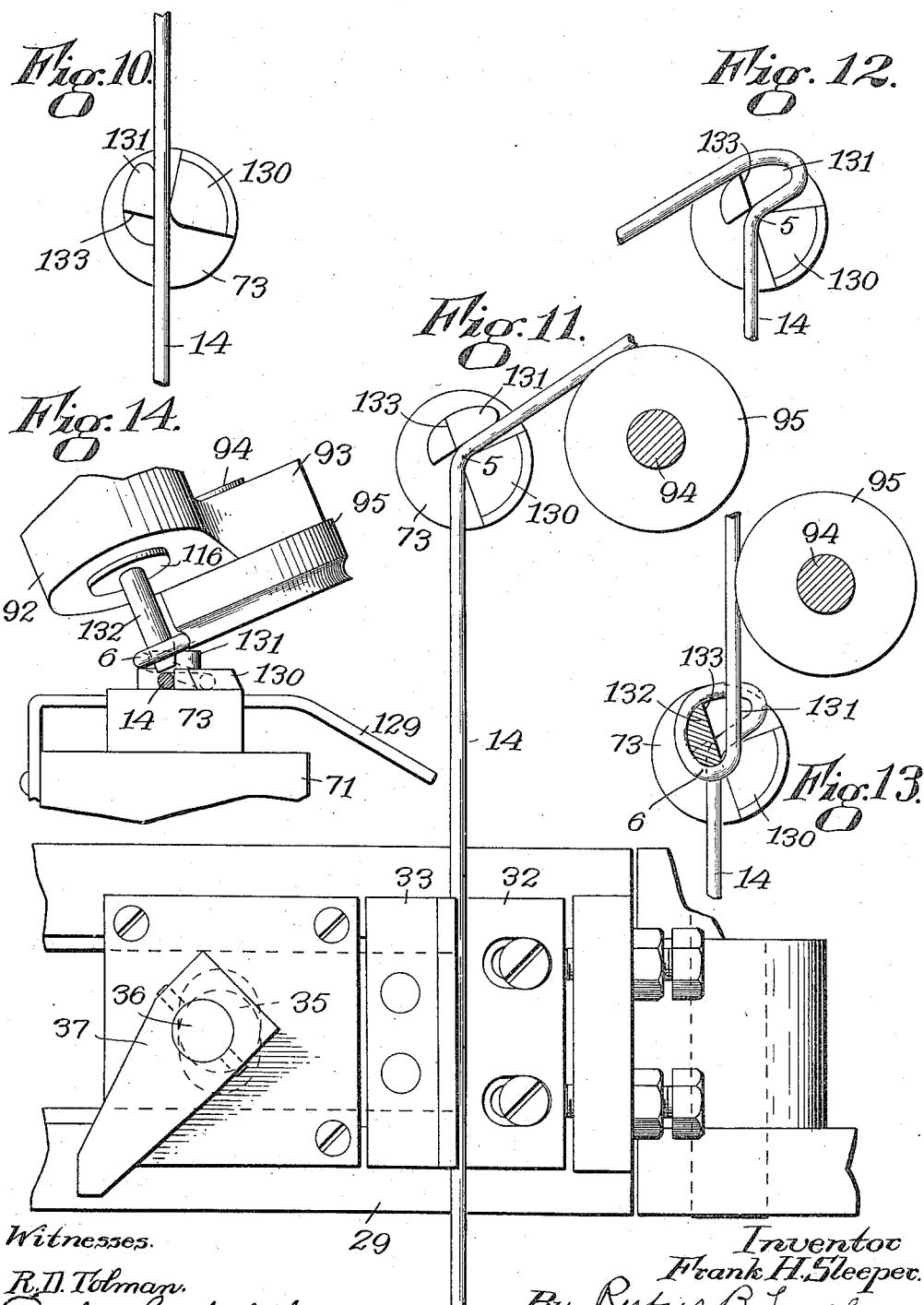

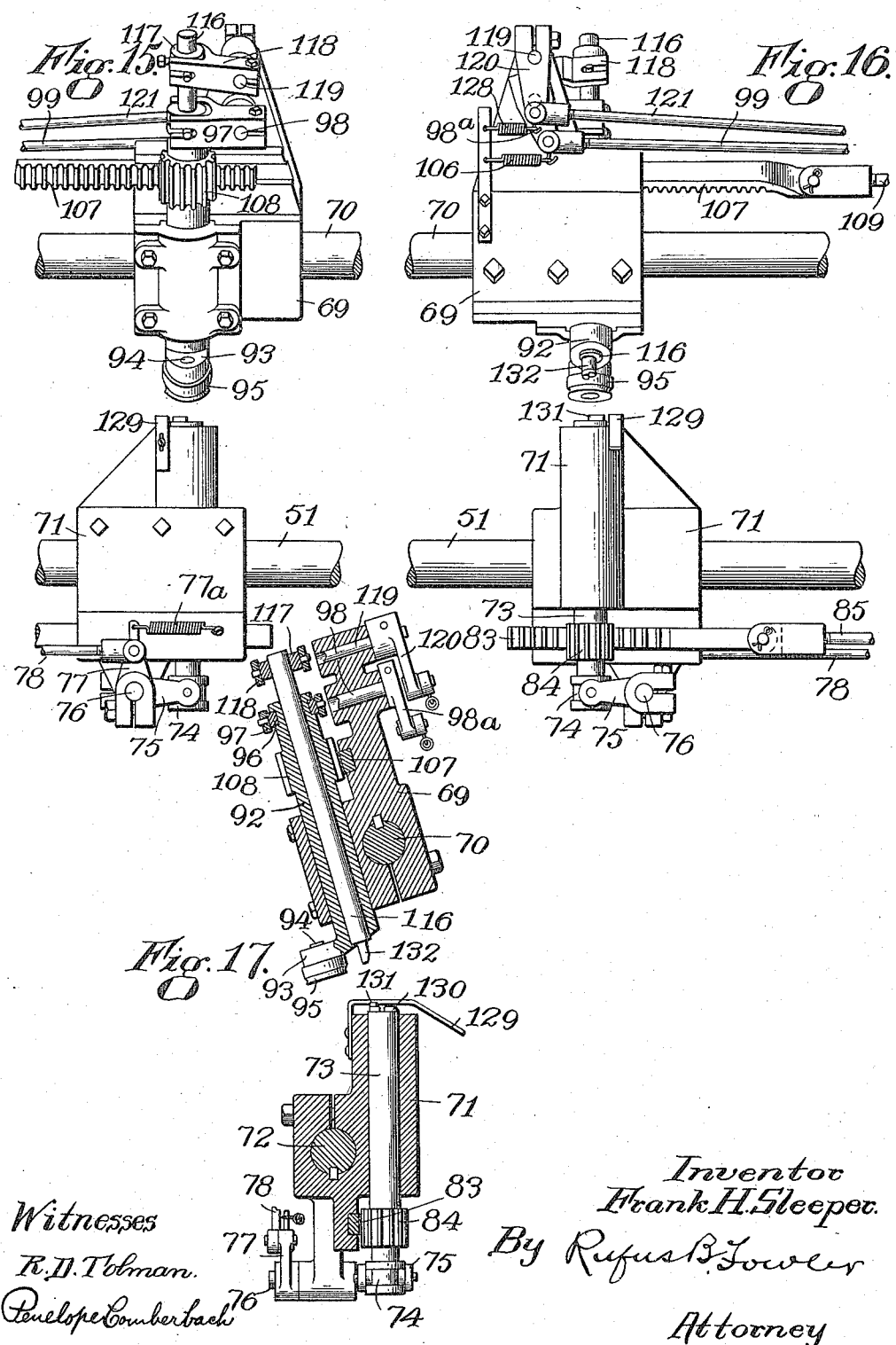

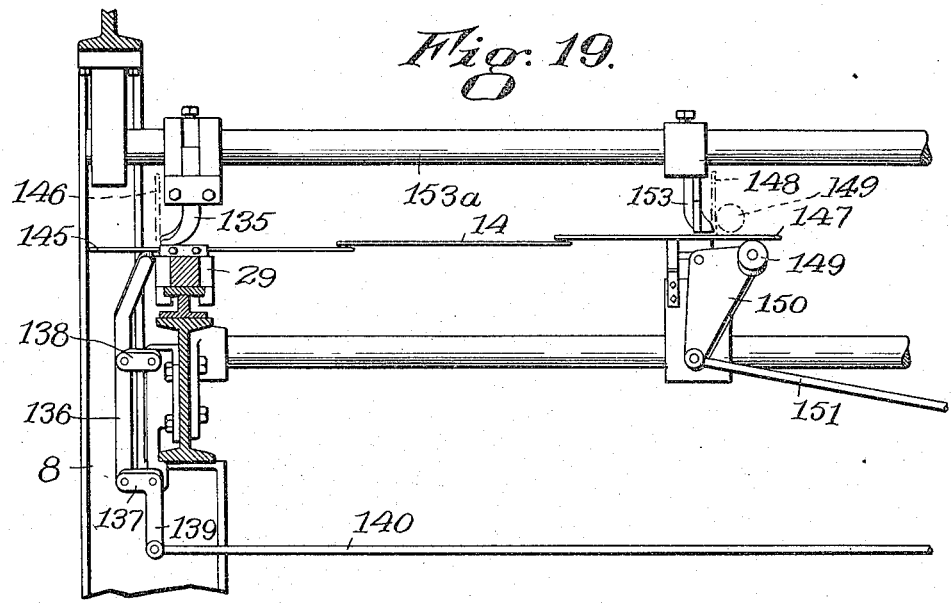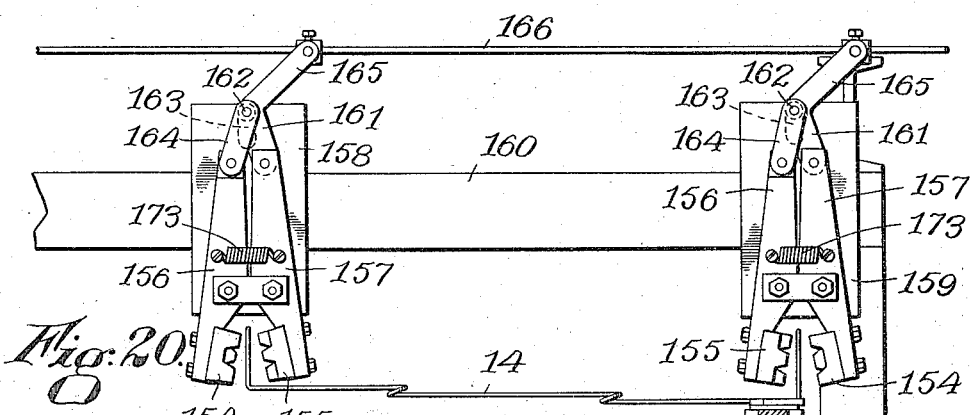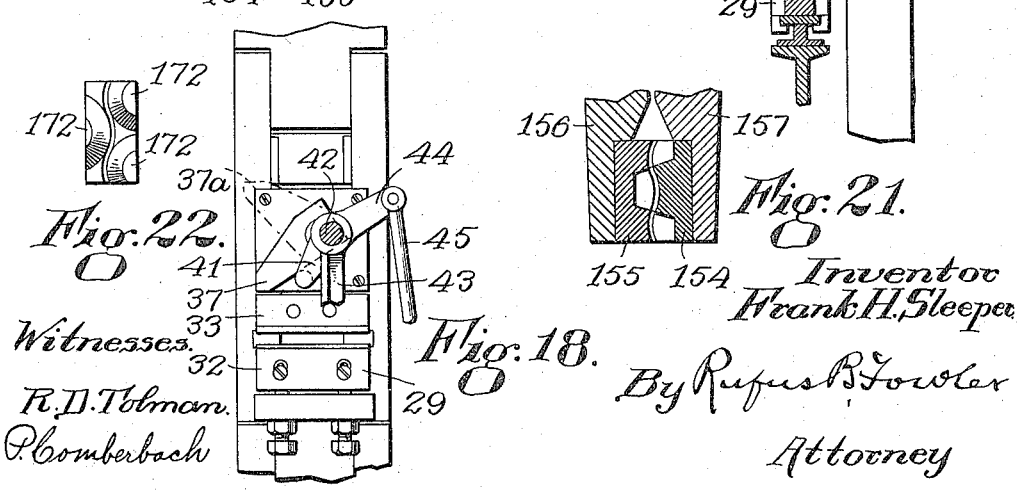

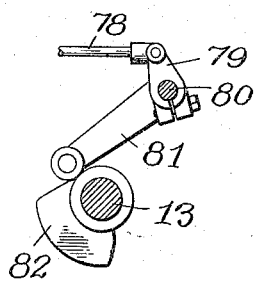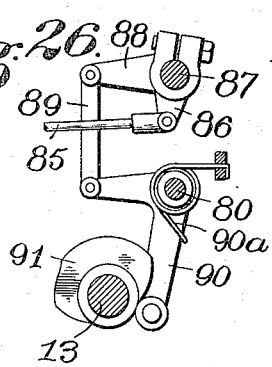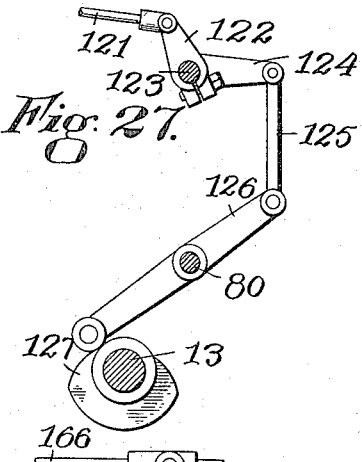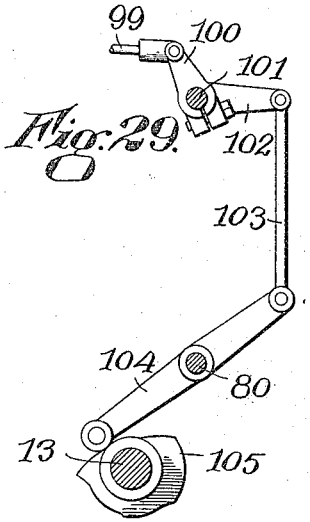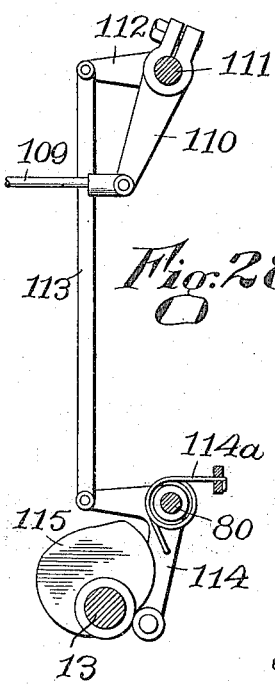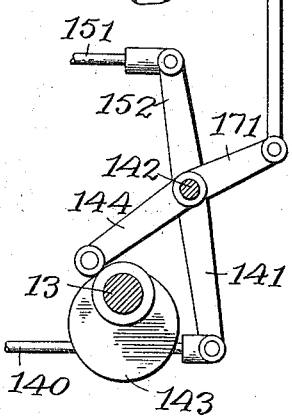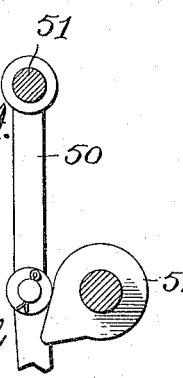

FRANK H. SLEEPER, OF WORCESTER, MASSACHUSETTS, ASSIGNOR TO NEW IDEA FENCING DROPPER COMPANY, LIMITED, OF ROCKHAMPTON, AUSTRALIA, A CORPORATION OF AUSTRALIA.

MACHINE FOR MAKING FENCING-DROPPERS.

1,148,467.  Specification of Letters Patent.  Patented July 27, 1915.

Application filed January 21, 1914. Serial No. 813,547.

*To all whom it may concern:*

Be it known that I, FRANK H. SLEEPER, a citizen of the Dominion of Canada, residing at Worcester, in the county of Worcester and Commonwealth of Massachusetts, have invented a Machine for Making Fencing-Droppers, of which the following is a specification accompanied by drawings, forming a part of the same.

My present invention relates to a machine for the automatic production of that type of stay wires for wire fences known and herein referred to as fencing droppers.

The several mechanisms embodied in the machine as hereinafter described are capable of some change or modification without departing from the scope and spirit of my invention, inasmuch as the several functions performed by the machine are broadly new.

The novel features of my invention are pointed out in the annexed claims and the construction of the machine is hereinafter described and illustrated in the accompanying drawings, in which—

Figure 1 represents in elevation a section of a wire fence composed of longitudinal strand wires having fencing droppers applied thereto. Figs. 2 and 3 are detached views of one of the droppers. Fig. 4 is a detached and end view of one of the droppers. Fig. 5 is a plan view of the machine embodying my present invention. Fig. 6 is a side view. Fig. 7 is an end elevation shown in section on the plane of the broken line 7—7, Fig. 5, looking in the direction of the arrow A, representing the clamping and loop forming mechanisms. Fig. 8 is a plan view on a larger scale of the gripping jaws by which the wire for each individual dropper is held as it passes through the machine. Fig. 9 is a side view of the same, partly shown in section, on the plane of the broken line 9—9, Fig. 8, looking in the direction of the arrow B. Figs. 10, 11, 12, 13 and 14 represent portions of the mechanism for forming a loop in the dropper by which it engages the strand wire, the several figures indicating successive steps in forming the loop. Figs. 15 and 16 show front and rear sides, respectively, of the loop forming mechanism. Fig. 17 is a central sectional view of the loop forming mechanism. Fig. 18 is a plan view of the wire gripping mechanism. Fig. 19 represents the two mechanisms for turning up the ends of the wire at an angle to the body portion of the dropper, forming arms for engaging the strand wires. Fig. 20 represents the mechanism for crimping the angular arms of the dropper. Fig. 21 is a central sectional view of the crimping jaws. Fig. 22 represents the face of one of the crimping jaws. Figs. 23 and 24 are detached views of cam actuated mechanisms for closing the jaws of the gripping mechanism. Figs. 25 to 30, inclusive, represent cam actuated mechanisms for performing different operations as hereinafter described.

Similar reference characters refer to similar parts in the different views.

Referring to the accompanying drawings, Figs. 1 to 4 illustrate the construction of a fencing dropper and the mode of its application to the strand wires of a fence. In Fig. 1 the strand wires 1, in the present instance four in number, are assumed to be stretched taut and supported in the usual manner upon posts. The fencing droppers 2, 2, are each formed from a separate piece of wire and provided with loops 3, 3, adapted to engage the intermediate strand wires in the manner represented in Fig. 1. The ends of the fencing droppers are provided with arms 4 formed by bending the wire at substantially a right angle to the body portion of the dropper. The arms 4 are crimped and are given a slight spiral bend which adapts them to be wound upon the upper and lower strand wires of the fence. The loops 3 are so formed as to enable the strand wires to be engaged by a slight longitudinal and rotative movement of the fencing dropper, when the dropper is held in position by the intertwining of the arms 4 with the strand wires. The loops 3, in the present instance are formed by bending the wire at 5 and then looping the wire to form a hook 6 situated in a plane slightly removed from the bend 5. To apply the fencing dropper to the strand wires the dropper is placed against the strand wires and in relative position thereto, as represented in Fig. 2. The dropper is then raised longitudinally to bring the strand wire into the hook 6, and the dropper is then given a partial rotation about its axis, which can readily be accomplished by the leverage afforded by the arms 4 to carry the strand wire against the bend 5, as shown in Fig. 1. In this position the crimped arms 4 are intertwined with the upper and lower strand wires, thereby holding the fencing dropper in position. The formation of the loop in the fencing dropper is designed to produce a slight deflection at 7 in the strand wire by the rotation of the dropper to carry the strand wire against the bend 5, thereby preventing the fencing dropper from slipping upon the strand wire. The fencing droppers are made in various lengths according to the desired height of the fence. The number of loops formed in the dropper will depend upon the number of strand wires to be engaged, and the distance between the hooks 6, 6, is determined by the distance between the engaged strand wires of the fence.

It is the purpose of my present invention to provide a machine for the automatic production of the fencing droppers above described, capable of making such variations in the length of the droppers and in the position of the loops as may be required. The machine forming the subject of my present invention is designed to sever the wires for each individual dropper from a coil of wire; to form one or more loops; to bend and crimp the arms 4, and to release the completed fencing dropper from the machine, the several operations being automatic.

Referring to Figs. 5, 6 and 7, which represent assembled portions of my machine, 8 denotes a framework in which the operative parts of the machine are mounted. Power is applied to the machine through the belt pulley 9 and imparted through the miter gears 10, pinion 11, and gear 12, to the cam shaft 13. The wire 14, from which the droppers are to be made, is taken preferably from a reel, not shown, and is fed forward by a continuously rotating pair of feed rolls 15, connected with the cam shaft 13 by a train of gears 16, said train of gears comprising the so called change gears by which the speed of the feed rolls 15 may be increased or decreased. From the feed rolls 15 the wire 14 is conducted through a tubular guide 17, which constitutes a stationary cutter, and over a vertically reciprocating cutter 18 carried upon a sliding plate 19. The sliding plate 19 is engaged by a radial arm 20 on one end of a rock shaft 21. To the opposite end of the rock shaft 21 is attached a lever 22, having its upper end engaging one of a series of holes formed in a link 23. The link 23 is pivoted to the free end of a swinging arm 24 carrying a cam roll 25 which is held upon the periphery of a cam 26 on the cam shaft 13 by means of a spring 27. The speed of the feed rolls 15 is adjusted to feed forward at each cycle in the operation of the machine a length of wire 14 beyond the cutting mechanism sufficient to form an individual fencing dropper. If the length of the fencing dropper is to be varied, it is accomplished by moving the cutting mechanism along the tie rod 28 to which it is clamped and connecting the lever 22 with a corresponding hole in the link 23.

The advancing end of the wire 14 is fed between the jaws of a clamping mechanism forming one of a series of clamping mechanisms mounted upon alternate links of an endless chain 29 carried upon the sprocket wheels 30 and 31. The clamping mechanism comprises a fixed jaw 32 and a movable jaw 33 represented upon a larger scale in Figs. 8 and 9. The movable jaw 33 is carried upon a sliding plate 34 and is actuated by an eccentric 35 on a spindle 36, to the upper end of which is attached a lever arm 37. The spindle 36 is provided with a pair of recesses 38 adapted to be engaged at each end of a slight angular movement of the spindle 36, by a plug 39 bearing against a compression spring 40. The spring 40 exerts a yielding pressure to hold the plug 39 in frictional engagement with one of the recesses in the spindle 36, thereby holding the spindle from accidental displacement at each end of its rotative movement. When the wire 14 has been inserted between the jaws of the clamping mechanism it is clamped by the rotation of the eccentric 35 produced by swinging the lever arm 37 from the position shown by solid lines in Fig. 18 to the position shown by broken lines 37ª. The rocking of the arm 37 is accomplished by means of a crank arm 41 on the lower end of a spindle 42 journaled in a bracket 43 and carrying near its upper end a radial arm 44. The radial arm 44 is connected by a link 45 with an arm 46 attached to a rocking shaft 47. Carried upon the rocking shaft 47 is an arm 48 connected by a link 49 with a vertical lever 50 swinging on a tie rod 51, and actuated by a cam 52 to rock the spindle 42 and close the jaws of the clamping mechanism. Prior to the rocking motion of the spindle 42, however, a longitudinal movement is imparted to the spindle 42 to move it toward the clamping mechanism in order to carry the crank arm 41 down into engagement with the lever arm 37. The longitudinal movement of the rocking spindle 42 is accomplished by means of a grooved collar 53 attached to the upper end of the rocking spindle 42 and engaged by the forked end of the arm 54 of a bell crank lever. The other arm 55 of the bell crank lever is pivotally connected by a link 56 with an arm 57 attached to a rocking shaft 58 which carries at its inner end a radial arm 59 connected by a link 60 with a vertical lever 61 which swings upon the tie rod 51 and is actuated by a cam 62 to slide the spindle 42 downward and carry its crank arm 41 into engagement with the lever arm 37.

At each cycle of operation the wire 14 is projected by the feed rolls between the jaws of the clamping mechanism a sufficient distance beyond the jaws to form one of the arms 4 of the fencing dropper. The cutting mechanism having been adjusted on the tie rod 28 at the proper distance from the clamping mechanism cuts off a length of wire sufficiently long to form the desired number of loops and the crimped arm 4 at the opposite end of the dropper. By adjusting the peripheral speed of the feed rolls 15 the proper length of wire is severed to form a fencing dropper of the desired length. The cam shaft 13 carries a bevel gear 63 engaging a bevel gear 64 on a transverse shaft 65. The shaft 65 carries the cams 52 and 62 already alluded to. From the shaft 65 an intermittent motion is imparted to the sprocket wheel 30 by means of a well known driving mechanism constituting the so called Geneva motion, comprising a star wheel 66 on the shaft of the sprocket wheel 30, said star wheel being alternately rotated and locked from rotation in a manner which will be well understood by those familiar with the Geneva motion.

The intermittent movement of the sprocket wheel 30 carries the endless chain 29 and its series of clamping mechanisms by a step-by-step movement. The first step carries the severed wire which has already been clamped into the position indicated at 67, Fig. 5, which is an idle position. The second step carries the wire forward into position to be operated upon by a loop forming mechanism for forming the first loop in the fencing dropper. The next step in the movement of the endless chain carries the wire with one loop formed therein into the position shown at 68, which is also an idle position. The next step in the movement of the chain 29 carries the wire into position to be operated upon by the second loop forming mechanism. Subsequent steps in the movement of the chain 29 bring the wire into position to be acted upon, first by mechanism for turning the arms 4 at right angles to the body of the fencing dropper, and second, mechanism for crimping the arms 4. During the continued movement of the chain, after the completion of the fencing dropper, means are provided to reverse the movement of the lever arm 37 and open the jaws of the clamping mechanism.

The mechanisms for forming the several loops are duplicates of each other and only one will therefore be described in detail. Each looping mechanism comprises movable parts which are mounted in an upper and a lower head, each adjustably attached to tie rods extending transversely across the machine. The heads containing the looping mechanisms are shown on a larger scale in Figs. 15, 16 and 17, and their operation is illustrated by diagrammatic views, Figs. 10 to 14 inclusive.

Referring to Figs. 15 and 16, which show front and rear sides respectively of the loop forming mechanism, 69 denotes the upper head adjustably attached upon a tie rod 70, and 71 denotes the lower head adjustably attached upon the tie rod 51. Journaled in the lower head 71, shown in sectional view in Fig. 17, is a spindle 73, to the lower end of which a grooved collar 74 is attached, engaged by a forked arm 75 carried upon one end of a rock shaft 76. The opposite end of the rock shaft 76 is provided with a radial arm 77 pivotally connected by a link 78 to an arm 79, Fig. 25, clamped upon a rocking shaft 80. The rocking shaft 80 carries a radial arm 81 which is actuated by a cam 82 on the cam shaft 13 to raise the spindle 73 into position to engage the wire and to allow the spindle to fall after the formation of a loop aided by a spring $77^a$, Fig. 15. When the spindle 73 has been raised to engage the wire, as hereinafter described, a slight rotative movement is imparted to the spindle by means of a reciprocating rack 83 engaging a pinion 84 on the spindle 73. The rack 83 is pivotally connected by a link 85 with an arm 86 attached to a rock shaft 87, Fig. 26. The rock shaft 87 is provided with an arm 88 connected by a link 89 with a bell crank 90 rocking upon the shaft 80 and actuated by a cam 91 on the cam shaft 13.

In the upper head 69 is journaled a hollow shaft 92, Fig. 17, provided at its lower end with a laterally extended arm 93 carrying a stud 94 upon which is journaled a grooved roll 95. The hollow shaft 92 is provided at its upper end with a peripheral groove containing a loose collar 96 engaged by a forked arm 97 attached to one end of a rock shaft 98. The opposite end of the rock shaft 98 carries an arm $98^a$ pivotally connected by a link 99 with an arm 100 attached to a rocking shaft 101, Fig. 29. The rocking shaft 101 carries an arm 102 connected by a link 103 with a two armed lever 104 rocking upon the shaft 80, and actuated by a cam 105 on the cam shaft 13 to raise the hollow shaft 92 and allow it to fall aided by a spring 106, Fig. 16. Sliding in ways in the head 69 is a reciprocating rack 107 engaging a pinion 108 on the hollow shaft 92, by which the latter is rotated to form a loop in the wire. The rack 107 is pivotally connected by a link 109 with an arm 110 attached to a rock shaft 111, Fig. 28. The rock shaft 111 carries an arm 112 pivotally connected by a link 113 with a bell-crank 114, capable of swinging on the shaft 80 and actuated by a cam 115 on the cam shaft 13. As the cams 91 and 115 are single acting cams the movement of the reciprocating racks 83 and 107 are reversed by the torsional springs 90$^a$ applied to the bell-crank 90, and 114$^a$ applied to the bell-crank 114. Inclosed in the hollow shaft 92 and capable of sliding longitudinally therein is a spindle 116, to the upper end of which is attached a collar 117 engaged by a forked arm 118 attached to the rock shaft 119. Attached to the opposite end of the rock shaft 119 is an arm 120 pivotally connected by a link 121 with an arm 122 on a rock shaft 123, Fig. 27. The rock shaft 123 carries an arm 124 pivotally connected by a link 125 with a two-armed lever 126, capable of rocking on the shaft 80 and actuated by a cam 127 on the cam shaft 13, to raise the spindle 116 and allow it to fall aided by a spring 128, Fig. 16.

The wire 14 to be looped, is carried forward by the clamping mechanism mounted on the endless feed chain 29 until the wire is brought over the center of the spindle 73 in the lower head 71, the wire being prevented from drooping and contacting with the spindle 73 by means of a bent guard plate 129. The upper end of the spindle 73 is provided with two projections 130 and 131. The projection 131 is slightly higher than the projection 130, and as the wire 14 is brought into position over the center of the spindle 73 the latter is raised, bringing the projection 131 above the guard plate 129, thereby providing a stop for the movement of the wire 14. The continued upward movement of the spindle 73 brings the projection 130 above the guard plate 129, as shown in Fig. 14, with the wire resting upon the end of the spindle 73 and between the projections 130 and 131, as shown in Fig. 10. A slight rotary movement is then given to the spindle 73 by the reciprocating rack 83 forming the bend 5 in the wire, as shown in Fig. 11, bringing the wire against the grooved roll 95, which during the rotation of the spindle 73 has been lowered into the path of the wire by the depression of the hollow shaft 92. The sliding spindle 116 is depressed, bringing a projection 132 on the lower end against the projection 131 on the spindle 73. The projection 131 is notched, forming a shoulder 133, and the projection 132 is correspondingly notched, forming a shoulder which overlaps and bears against the shoulder 133 when the spindle 116 is in its lowest position. The interlocking of the two projections 131 and 132 stiffens each against the strain of forming a loop in the wire around said projections as a former. The wire 14 resting in the groove of the roller 95 is bent around the projection 131 by the rotation of the roller 95 around the spindle 73 forming a bend in the wire, as illustrated in Fig. 12. The continued travel of the roller 95 around the spindle 73 completes the loop in the wire, forming the hook 6 around the projection 132.

During the continued bending of the wire to form a loop and complete the hook 6 the hollow shaft 92 is raised, bringing the wire by its engagement with the groove in the roller 95 into a higher plane, carrying the free end of the wire over the loop already formed, as shown in Figs. 13 and 14. The spindles 73 and 116 are then lowered and raised, respectively, clearing them from the loop in the wire, and the hollow shaft 92 and grooved roll 95 are returned to their normal position. When the formation of the first loop has been completed and the wire released from the looping mechanism, it is carried forward by the intermittent movement of the feed chain 29 to bring the wire into the position shown at 68, Fig. 5, where it is held during the formation of the first loop in the next succeeding piece of wire. At the next intermittent motion of the feed chain 29 the wire is carried into position between the upper and lower heads of a second looping mechanism which are the duplicates of the heads 69 and 71 already described. The second looping mechanism whose position is indicated at 134, Fig. 5, is adjustably supported upon tie rods similarly to the heads 69 and 71 which enables the distance between the loops to be varied.

In the machine illustrated in the accompanying drawings looping mechanisms are provided for forming two loops in the wire. If more loops are required the machine is extended and other looping mechanisms added. After the formation of the last loop in the wire the intermittent motion of the chain 29 carries the looped wire into position to be acted upon by bending mechanisms which turn up the opposite ends of the wire to form the arms 4, as represented in Fig. 19. One end of the wire 14 is bent around a curved bar 135 by the upward movement of a bending bar 136 pivoted at one end to the arm 137 of a bell-crank and also pivotally connected by a link 138 with the framework of the machine. The arm 139 of the bell-crank is pivotally connected by a link 140 with an arm 141, Fig. 30, attached to a rock shaft 142, which is actuated by a cam 143 through an arm 144 attached to the rock shaft 142 to push the link 140 and raise the bending bar 136 to raise the end 145 of the wire 14 into the position shown by broken lines 146, Fig. 19. The opposite end 147 of the wire is bent into the position shown by broken lines 148, Fig. 19, by means of a grooved roll 149 carried upon a rocking plate 150. The plate 150 is pivotally connected by a link 151 with an arm 152, Fig. 30, carried upon the rocking shaft 142 and actuated by the cam 143 to pull the link 151 and turn up the end of the wire around the lower end of a curved bar 153. The bars 153 and 135 are held in clamping devices adjustably attached to the tie rod 153ª. The next intermittent movement of the chain 29 carries the upturned ends of the wire 14 between duplicate pairs of crimping plates 154 and 155 carried upon levers 156 and 157 pivoted upon plates 158 and 159 adjustably attached to a cross bar 160, thereby enabling the crimping mechanism to be spaced to correspond with the length of the dropper. The levers 157 are pivotally connected to the arms 161 of bell crank·levers which rock upon studs 162 held in and capable of sliding in slots 163 in the plates 158 and 159. The pivotal studs 162 are connected by links 164 with the ends of the levers 156. The other arms 165 of the bell crank levers are pivotally connected with a pull rod 166 which rod is connected with one arm 167 of a bell crank lever rocking upon a rock shaft 168. The other arm 169 of the bell crank lever is connected by a link 170 with an arm 171 on the rock-shaft 142. As the rod 166 is pulled by the action of the cam 143 the bell-crank levers are rocked to bring the crimping plates 154 and 155 together to crimp the interposed arms of the wire 14. The opposing faces of the crimping plates 154 and 155 not only crimp the ends of the wire, as shown in Fig. 21, but the projections 172 are staggered, as shown in Fig. 22, by which a spiral form is imparted to the crimped ends of the wire forming the arms 4 which are adapted to be intertwined with the strand wires of the fence, as represented in Fig. 1.

When the crimping plates 154 and 155 are released by the action of the cam 143 the crimping plates are separated by springs 173, Fig. 20. The next intermittent movement of the chain 29 carries the free end of the lever arm 37 against a plate 174, Figs. 5 and 6, supported upon a framework 175 which causes the lever arm 37 to be moved from the position shown by broken lines 37ª, Fig. 18, to its original position as shown by the solid lines in Fig. 18. This movement of the lever arm 37 as it is carried past the fixed plate 174 by the intermittent movement of the chain rocks the spindle 36 and eccentric 35, Fig. 9, to open the jaw 33 and cause the release of the completed fencing dropper as the chain 29 passes over the sprocket wheel 31.

I claim,

1. In a machine of the kind specified, a clamping mechanism, means for imparting an intermittent motion to said clamping mechanism, a pair of feed rolls, means for varying the peripheral speed of said feed rolls relatively to the movement of said clamping mechanism, a severing mechanism interposed between said feed rolls and said clamping mechanism, and means for adjusting the position of said severing mechanism relatively to said clamping mechanism.

2. In a machine of the kind specified, a loop forming mechanism, means for intermittently actuating the loop forming mechanism, means for feeding a predetermined length of wire during the operation of the loop forming mechanism, means for varying the length of wire fed during the operation of the loop forming mechanism, means for severing the wire, and means for changing the position of the severing mechanism relatively to the feeding mechanism in order to vary the length of the severed piece.

3. In a machine of the kind specified, a loop forming mechanism, means for intermittently actuating said loop forming mechanism to form a loop, a clamping mechanism for holding a piece of wire, means for imparting an intermittent movement to said clamping mechanism alternating with the intermittent operation of said looping mechanism, means for feeding a continuous wire to said clamping mechanism, means for severing the continuous wire between the clamping and feeding mechanisms, and means for varying the length of the severed piece.

4. In a machine of the kind specified, a pair of feed rolls, means for continuously rotating said rolls, means for varying the speed of said rolls, a cutting mechanism for severing the wire, and means for adjusting the position of said cutting mechanism relatively to said feed rolls.

5. In a machine of the kind specified, a clamping mechanism, a feeding mechanism for feeding a continuous wire to said clamping mechanism, means for continuously operating said feeding mechanism, a cutting mechanism for severing the wire between the feeding and clamping mechanisms, means for adjusting the cutting mechanism relatively to said clamping mechanism, whereby the length of the severed piece may be varied, and means for changing the speed of the feeding mechanism to correspond with the change in distance between the cutting and the clamping mechanisms.

6. In a machine of the kind specified, a loop forming mechanism, means for intermittently actuating said loop forming mechanism, means for feeding pieces of wire successively to said loop forming mechanism, comprising an endless chain, a series of clamping mechanisms carried by said chain, means for imparting an intermittent motion to said chain during the period of rest of said loop forming mechanism, and means for closing a clamping mechanism during the period of rest of said chain, a feeding mechanism, and means for actuating said feeding mechanism to feed a predetermined length of wire during the period of rest of said chain.

7. In a machine of the kind specified, means for feeding a continuous wire by a longitudinal movement, means for severing the wire into pieces of a predetermined length, a loop-forming mechanism, and means for moving the severed pieces sidewise by a step-by-step movement through the machine and into engagement with the loop-forming mechanism.

8. In a machine of the kind described, a looping mechanism comprising a spindle slidable longitudinally, a pair of spaced projections on the end of said spindle of different lengths, a bent guard wire extending transversely across the end of said spindle and beyond said projections, means for moving said spindle longitudinally to bring its longer projection beyond said guard wire to serve as a stop and by the continued movement of the spindle to inclose the wire between said projections, and means for moving a wire sidewise over said guard wire during the longitudinal movement of the spindle.

9. In a machine of the kind specified, a looping mechanism comprising a spindle having a pair of spaced projections on one of its ends, a bent guard wire extending transversely across the end of said spindle, means for imparting a sidewise movement to a wire to carry it over said guard wire, means for moving said spindle endwise to engage the wire between said projections, and means for imparting a partial rotation to said spindle to give an initial bend to the wire around one of said projections.

10. In a machine of the kind specified, a loop forming mechanism comprising loop formers, means for moving said formers into operative position, means for actuating said loop-forming mechanism to form an initial bend in one direction in a wire, and means for actuating said loop-forming mechanism to bend the wire in the opposite direction to form a loop in a different plane from said initial bend and spaced therefrom.

11. In a machine of the kind specified, a clamping mechanism for holding a wire, means for moving said clamping mechanism to impart a sidewise motion to the wire, and a loop-forming mechanism arranged in the path of the wire as the latter is moved sidewise, means for intermittently moving said clamping mechanism, and means for actuating said loop-forming mechanism, with the movement of the clamping mechanism alternating with the movement of the loop-forming mechanism.

12. In a machine of the kind specified, a loop forming mechanism, comprising a pair of spindles on opposite sides of the wire to be bent, said spindles having projections constituting formers around which the wire is to be bent, means for moving the spindles longitudinally to bring their opposing ends into engagement with each other and with the wire to be bent, wrapping means for winding the wire around said formers to form a loop, and means for moving said wrapping means in a line parallel with the axis of said spindles during the winding of the wire in order to bring the wire on opposite sides of the loop into different planes.

13. In a machine of the kind described, a clamping mechanism, means for moving a continuous wire lengthwise into engagement with the clamping mechanism, means for severing the wire, means for moving the severed wire sidewise with alternating periods of rest, and means for forming loops in the wire during its period of rest.

14. In a machine of the kind specified, a looping mechanism comprising a pair of spindles, each of said spindles having projections on one of its ends, means for moving said spindles longitudinally toward each other to bring said projections together, means for winding the wire around said projections to form a loop, and means for moving the wire parallel with the axis of one of said spindles during the process of winding to bring opposite sides of the loop into different planes.

15. In a machine of the kind described, a multiplicity of looping mechanisms arranged to operate simultaneously upon a multiplicity of wires in a consecutive order, and means for adjusting the position of said looping mechanisms to vary the position of the loops on the wires, and means for moving a series of wires into positions to be successively operated upon by said looping mechanisms.

16. In a machine of the kind described, a clamping mechanism for holding a wire near one of its ends, means for moving said clamping mechanism intermittently to impart a sidewise movement to the wire, two or more looping mechanisms arranged at different points in the path of the wire and in different planes, and means for actuating said looping mechanisms simultaneously and during the period of rest in the movement of the wire.

17. In a machine of the kind described, an endless chain, a series of clamping mechanisms carried thereby, means for feeding the end of a continuous wire successively to said clamping mechanisms, means for severing the wire, means for intermittently moving the endless chain to impart a sidewise movement to the severed pieces of wire, a series of looping mechanisms arranged at different points in the path of the wires and in different planes, and means for intermittently actuating said looping mechanisms whereby a multiplicity of loops are simultaneously formed in the successive wires.

18. In a machine of the kind described, means for moving a series of wires by a sidewise movement, means for forming loops in the wires successively, means for bending the opposite ends of the wires at an angle but in different planes, and means for crimping the bent ends of the wires.

19. In a machine of the kind described, clamping mechanisms for holding pieces of wire in fixed positions, means for moving said clamping mechanisms by a step-by-step movement, a looping mechanism for forming loops in the pieces of wire, bending mechanisms for bending the opposite ends of the wire, and crimping mechanisms for crimping the bent ends of the wire, said mechanisms being arranged to operate simultaneously on successive pieces of wire, and means for releasing the pieces from the clamping mechanisms.

20. In a machine of the kind described, means for severing a piece of wire from a continuous wire, means for clamping each severed piece of wire, means for moving the piece by a step-by-step movement, means for forming a loop in the piece of wire, means for bending the ends of the piece of wire, and means for crimping the bent ends of the wire, all of said several mechanisms being arranged for conjoint operation.

Dated this seventeenth day of January 1914.

FRANK H. SLEEPER.

Witnesses:
PENELOPE COMBERBACH,
NELLIE WHALEN.

Copies of this patent may be obtained for five cents each, by addressing the "Commissioner of Patents, Washington, D. C."